United States Patent [19]

Sevigny

[11] Patent Number: 4,607,597
[45] Date of Patent: Aug. 26, 1986

[54] BIRD FEEDER

[76] Inventor: Charles P. Sevigny, 16 Barque Hill Dr., Norwell, Mass. 02061

[21] Appl. No.: 726,673

[22] Filed: Apr. 24, 1985

[51] Int. Cl.$^4$ ............................................. A01K 39/01
[52] U.S. Cl. ................................................. 119/51 R
[58] Field of Search ............ 119/51 R, 52 R; D30/14, D30/15

[56] References Cited

U.S. PATENT DOCUMENTS

| | | | |
|---|---|---|---|
| D. 205,772 | 9/1966 | Blair | D30/15 |
| 4,019,462 | 4/1977 | Palfalvy | 119/51 R X |
| 4,246,869 | 1/1981 | Tobin, Jr. | 119/51 R |
| 4,356,793 | 11/1982 | Blasbalg | 119/51 R |

FOREIGN PATENT DOCUMENTS

| | | | |
|---|---|---|---|
| 197224 | 7/1938 | Switzerland | 119/51 R |
| 2131267 | 6/1984 | United Kingdom | 119/51 R |

Primary Examiner—Robert P. Swiatek

[57] ABSTRACT

A bird feeder shaped like an inverted cone with wavy sides is disclosed. The bird feeder preferably is formed from a transparent polymer as a thin walled container in the shape of the inverted cone. The upper extremity of the bird feeder has an extended top opening, capped by a removable member, and the lower extremity has a restricted bottom apex. The wavy sides are defined by opposed convoluted profiles having outwardly protrusive shoulder regions and inwardly recessive waist regions, respectively forming an outer ridge line and an inner waist in. Certain shoulder regions below the ridge lines have a number of feed apertures, formed with an upwardly directed slant. Opposed mounting apertures are provided to accomodate a number of perches extending from the container on both sides and in operative relation to the feed apertures. A hanger is provided adjacent the top opening and a hook adjacent the bottom apex. Thereby a number of such containers can be hung on above the other in a row. The hook also can accomodate solid bird feed, such as suet or salt port.

16 Claims, 4 Drawing Figures

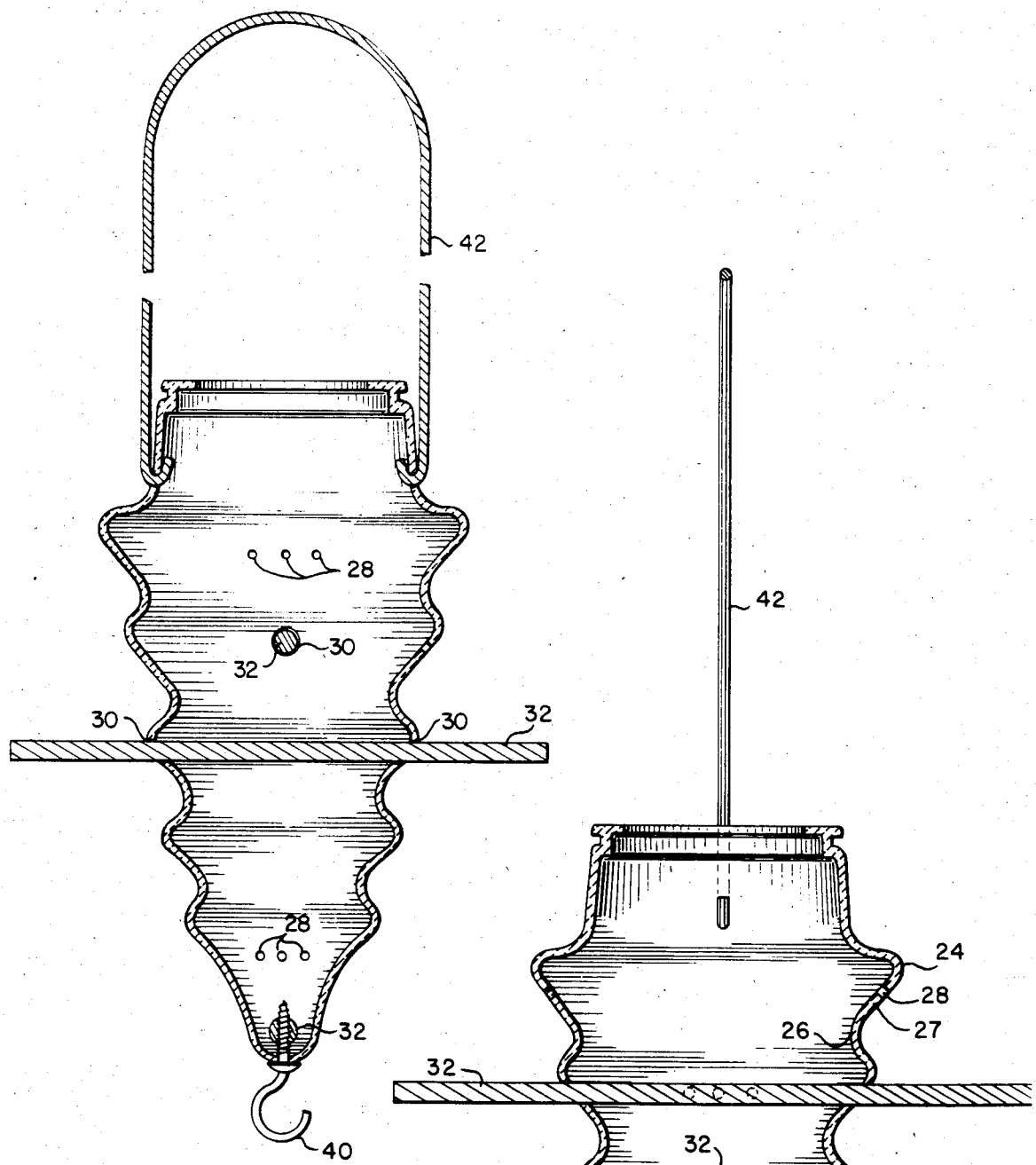

BIRD FEEDER

BACKGROUND OF THE INVENTION

1. Field of the Invention

The present invention relates generally to bird feeders and, more particularly, to a bird feeder shaped like an inverted cone with wavy sides.

2. The Prior Art

Bird feeders have been with us for a long time. They come in all sizes and shapes. Some are as simple as a dish, others as complex as a bird cage itself. Most bird feeders with tops feature straight sides or no sides at all. An underlying problem of most, if not all, presently known bird feeders has been the difficulty of preserving the feed against the adverse effects of the elements while at the same time allowing access to the feed by the birds and, yet keeping the bird feeder simple and inexpensive to make.

SUMMARY OF THE INVENTION

It is a principal object of the present invention to overcome the above disadvantages by economically providing a bird feeder of unique shape and construction so that it will readily shed water, preventing thereby the feed from spoiling.

More specifically, it is an object of the present invention to provide a bird feeder formed, as a thin walled container in the shape of an inverted cone with wavy sides, from a transparent polymer, preferably by injection or blow molding. If desired, it also can be formed of glass. The upper extremity of the bird feeder is provided with an extended top opening, capped by a removable member, and the lower extremity has a restricted bottom apex. The wavy sides of the container are defined by opposed convoluted profiles having outwardly protrusive shoulder regions and inwardly recessive waist regions, respectively forming an outer ridge line and an inner waist line. Certain shoulder regions below the ridge lines are provided with a number of feed apertures, formed with an upwardly directed slant. Opposed mounting apertures also are formed in the container to accomodate therethrough a number of perches extending diametrically through the container and extending therefrom on both sides. The perches preferably are located one ridge line below and in operative relation to the feed apertures, allowing the birds both to perch and feed at the same time. Preferably, the transparent polymer is selected from the group including styrene, styrene acrylonitrile, acrylonitrile butadiene styrene and polyethylene. Preferably, the bird feeder further is provided with a hanger adjacent the top opening and with a hook adjacent the bottom apex. With the aid of the hangers and hooks, a number of bird feeders can be hung one above the other in a chain so as to attract and feed more birds. The hook also is useful for supporting solid bird food, such as suet or salt pork in the winter. Preferably, the thickness of both the thin walled container and the capping member is from about one to about ten mils, and the diameter of the feed apertures is from about 1/16 to about 5/16 of an inch. Preferably, the perch is made of wood or a hard plastic selected from the group including polypropylene, polycarbonate, nylon and polyurethane.

Other objects of the present invention will in part be obvious and will in part appear hereinafter.

The invention accordingly comprises the bird feeder of the present disclosure, its components, parts and their interrelationships, the scope of which will be indicated in the appended claims.

BRIEF DESCRIPTION OF THE DRAWINGS

For a fuller understanding of the nature and objects of the present invention, reference is to be made to the following detailed description, which is to be taken in connection with the accompanying drawings, wherein:

FIG. 2 is a vertical section along the line 2—2 of FIG. 1,

FIG. 3 is a vertical section along the line 3—3 of FIG. 1; and

DETAILED DESCRIPTION OF THE PREFERRED EMBODIMENT

Figure 4:
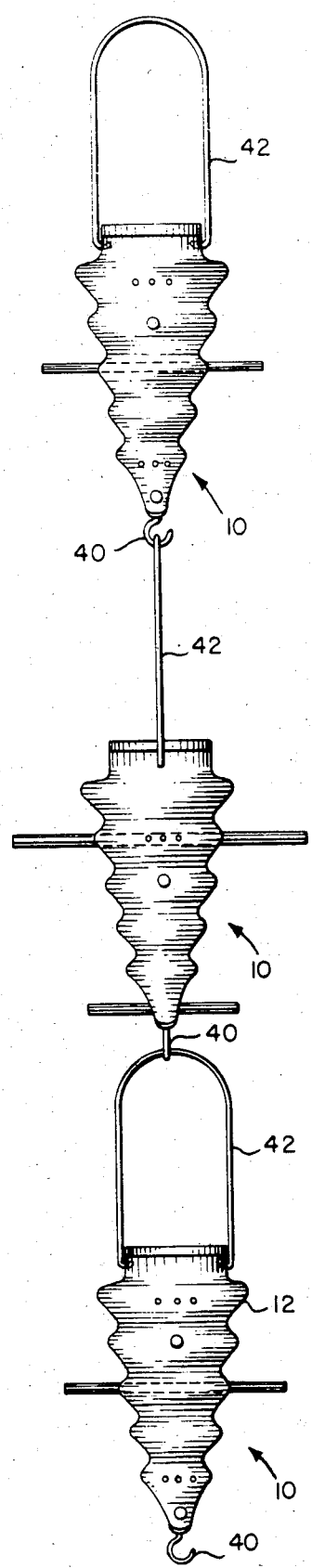
FIG. 4 depicts a number of bird feeders hung one above the other in a row.
Figure 1:
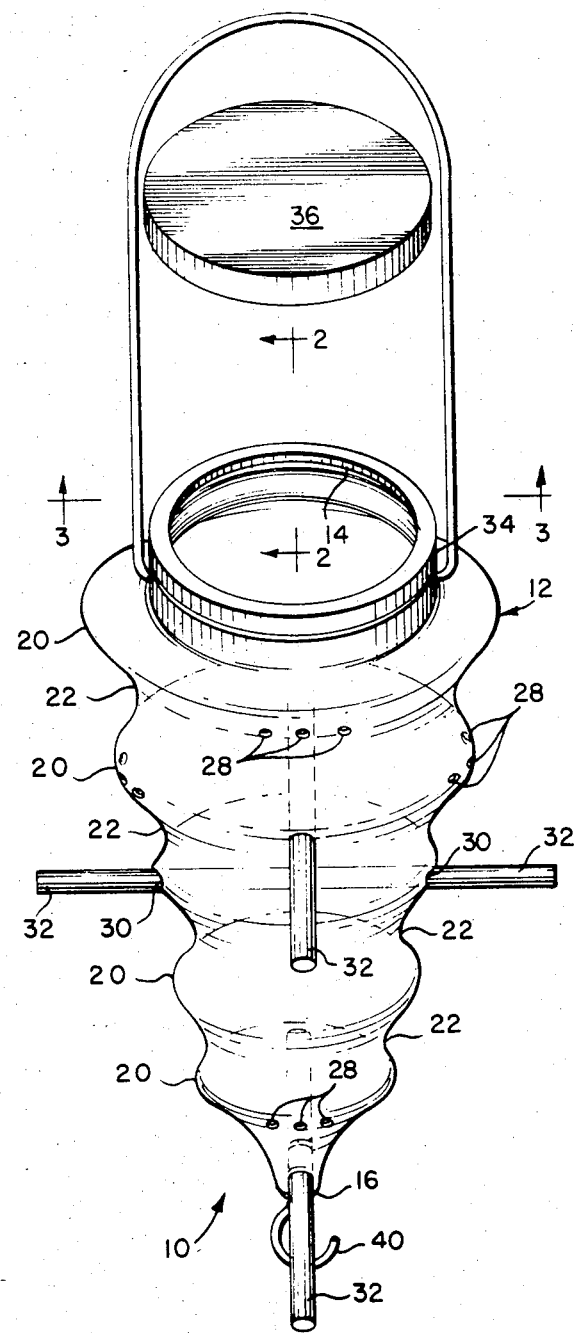
FIG. 1 is a front perspective and partly exploded view of a bird feeder constructed in accordance with the present invention.

In general, the illustrated embodiment of a bird feeder 10 constructed in accordance with the present invention is formed of a clear, transparent material in the shape of an inverted hollow cone container 12. As known, birds have sharp eyesight. Consequently, they will recognize their feed from afar. The clear, transparent material can be glass. Preferably however, the clear, transparent material is a transparent polymer selected from the group including styrene, styrene acrylonitrile, acrylonitrile butadiene styrene and polyethylene. Preferably, the inverted hollow cone shaped container 12 is formed as a thin walled container by injection or blow molding and with a thickness from about one to about ten mils, preferably about three mils. The resultant bird feeder 10 is thus not only transparent, but also is light in weight and inexpensive to make.

The inverted hollow cone shaped container 12 is provided at its upper extremity with a relatively extended top opening 14 and with a relatively restricted bottom apex 16 at its lower extremity. In between its extremities, the cone shaped container 12 is formed with a plurality of convoluted profiles, being widest at the upper extremity and converging toward the lower extremity. These plurality of convoluted profiles define thus progressively narrower parallel undulations having outwardly protrusive shoulder regions 20 and inwardly recessive waist regions 22. Each of the shoulder regions 20 has an outer ridge line 24, and each of the waist regions 22 has an inner waistline 26. The outer ridge line 24 separates a pair of reentrant annular sections: an upper section 25 and a lower section 27, which respectively extend to alternate waistlines 26. The inclination of the lower section 27 is gentler than that of the upper section 25. Consequently, rain water for the most part is propelled away from the inverted cone shaped container 12 at the ridge lines 24. This is important because feed apertures 28 are formed in the thin walled cone shaped container 12 in these lower sections 27 below the ridge lines 24. The feed apertures 28 further are formed with an upwardly directed slant. The location of these feed apertures 28 below the ridge lines 24, when combined with their upwardly directed slant, effectively preclude rain water from entering into the interior of the hollow inverted cone shaped container 12. Bird feed contained therein is not going to be spoiled, therefore. The size of the feed apertures 28 can vary from about 1/16 to about 5/16 of an inch, depending on the kind and size of the seed used.

The inverted hollow cone shaped container 12 further is provided with a number of pairs of diametrically opposed mounting apertures 30, formed in the shoulder regions 20 below the ridge lines 24 and in the lower sections 27 thereof. Due to the inclination of these lower sections 27, the cross section of these mounting apertures 30 is oblong. These pairs of opposed mounting apertures 30 are designed frictionally to hold therein a number of perches 32. Each of the perches 32 extends diametrically across the hollow inverted cone shaped container 12 and extends therefrom on both sides a distance, about two inches, sufficient for a bird to perch thereon. It should be noted that the perches 32 are both vertically spaced from one another and also are disposed at an angle to one another. Preferably, this angle of orientation between adjacent perches 32 is about 90°. They can be oriented to each other at different angles, however. A particularly attractive appearance is created where the bird feeder 10 is of a relatively large size, requiring more than the herein shown three perches 32, in which adjacent perches 32 are oriented toward one another at about thirty degrees.

The bird feeder 10 preferably is capped at its upper extremity by a deformable resilient member 36 designed to snap fit over a neck portion 34 formed in the inverted cone shaped container 12. Preferably, the resilient member 36 also is formed of one of the group of transparent polymers enumerated above, and is preferably made of polyethylene. Its thickness also can vary from about one to about ten mils. At the bottom apex 16, the bird feeder 10 preferably is provided with a metal hook 40, which conveniently is anchored therein by being secured to the lowermost perch 32, note FIG. 2. The metal hook 40 serves two purposes. First, during wintertime, it can be used to secure solid bird feed thereto, such as for example a piece of suet or salt pork, not shown, and during summer time, a piece of fruit, such as apple or the like. Second, the hook 40 also is used, in cooperation with a metal hanger 42 swinglike secured to the bird feeder 10 just below the neck portion 34, to hang one bird feeder 10 above the other in a vertical row, as illustrated in FIG. 4. Such an arrangement at once attracts and feeds more birds, while simultaneously presents an aesthetic appearance to passersby.

The perches 32 are made either of wood or of a hard plastic selected from the group including polypropylene, polycarbonate, nylon and polyurethane. Consequently, the feet of the birds perching on them will not freeze to the perches 32 even in the coldest of winters.

Although a single feed aperature 28, formed in the bird feeder 10 at a shoulder region 20 immediately above the location of a perch 32, is satisfactory, it has been found that since birds like to peck and choose, a number, preferably three, of adjacent feed apertures 28 are preferred at each feed location.

Thus it has been shown and described an improved bird feeder 10 of unique construction, which bird feeder 10 satisfies the object and advantages set forth above.

Since certain changes may be made in the present disclosure without departing from the scope of the present invention, it is intended that all matter described in the foregoing specification or shown in the accompanying drawings, be interpreted in an illustrative and not in a limiting sense.

What is claimed is:

1. A bird feeder comprising:

(a) a bird feed container formed of a transparent material in the shape of an inverted cone and provided with a wide top opening and restricted bottom apex, and a plurality of progressively narrower undulations between said top opening and said bottom apex, each of said plurality of undulations defining a pair of reentrant annular sections: an upper section and a lower section disposed on opposed sides of a central ridge line, the inclination of said lower section being gentler than that of said upper section;
    (b) at least one perch disposed diametrically across said container and extending on each side thereof;
    (c) a plurality of feed apertures formed in one of said undulations located upwardly and adjacent said at least one perch and formed in said lower section thereof: and
    (d) a removable cap designed for covering said wide top opening.

2. The bird feeder of claim 1 wherein said feed container is a thin walled container and said transparent material is a transparent polymer selected from the group including styrene, styrene acrylonitrile, acrylonitrile butadiene styrene and polyethylene.

3. The bird feeder of claim 2 wherein said thin walled container and said cap are from about one to about ten mils thick.

4. The bird feeder of claim 1 wherein said at least one perch is made of wood.

5. The bird feeder of claim 1 wherein said at least one perch is made of a hard plastic selected from the group including polypropylene, polycarbonate, nylon and polyurethane.

6. The bird feeder of claim 1 wherein said plurality of feed apertures are formed with an upwardly directed slant.

7. The bird feeder of claim 1 including a plurality of perches disposed at different levels between said wide top opening and said restricted bottom apex, with adjacent perches being at an angle to one another.

8. The bird feeder of claim 1 comprising a plurality of bird feed containers hung one above the other in a vertical row.

9. The bird feeder of claim 8 further provided with a hanger operatively mounted to said bird feed container adjacent said wide top opening thereof, and with a hook mounted to said bird feed container adjacent said restricted bottom apex.

10. A bird feeder comprising:

(a) a thin walled container formed of a transparent polymer;
    (b) the upper extremity of said container having an extended top opening and the lower extremity of said container having a restricted bottom apex;
    (c) said container having opposed convoluted profiles converging from said top opening toward said bottom apex;
    (d) said convoluted profiles having outwardly protrusive shoulder regions and inwardly recessive waist regions;
    (e) each of said shoulder regions having an outer ridge line and each of said waist regions having an inner waistline;
    (f) certain portions of said shoulder regions below said ridge lines and above said waist lines having feed apertures;
    (g) certain portions of said shoulder regions below said ridge lines and above said waist lines having pairs of diametrically opposed mounting apertures below said feed apertures;

(h) at least one perch mounted within one of said pairs of mounting apertures and extending on both sides from said container;

(i) a member for capping said top opening;

(j) a hanger swingably mounted to said container adjacent said top opening and a hook secured to said container at said bottom apex; and (k) a plurality of perches mounted within said pairs of diametrically opposed mounting apertures at different levels between said top opening and said bottom apex, with adjacent perches disposed at an angle to one another;

(l) each of said feed apertures being formed with an upwardly directed slant and each of said pairs of mounting apertures having an oblong cross sectional profile;

(m) said hanger and said hook formed of metal, said hook further being designed to support thereon solid bird food, such as suet and salt pork.

11. The bird feeder of claim 10 comprising
a plurality of said thin walled containers connected to one another in a stringlike fashion via said hangers and said hooks.

12. The bird feeder of claim 10 wherein said at least one perch is made of wood and said thin walled container and said capping member have a thickness from about one to about ten mils.

13. The bird feeder of claim 10 wherein said at least one perch is made of a hard plastic selected from the group including polypropylene, polycarbonate, nylon and polyurethane.

14. The bird feeder of claim 10 wherein said transparent polymer is selected from the group including styrene, styrene acrylonitrile, acrylonitrile butadiene styrene and polyethylene.

15. The bird feeder of claim 10 wherein said capping member is formed of polyethylene and said thin walled container is formed of styrene.

16. The bird feeder of claim 10 wherein said thin walled container is formed of glass.

* * * * *